US011827066B2

(12) United States Patent
Rautenberg

(10) Patent No.: US 11,827,066 B2
(45) Date of Patent: Nov. 28, 2023

(54) DEVICE FOR SECURING A PNEUMATIC SPRING WITH AN ACOUSTIC DECOUPLING FUNCTION

(71) Applicant: Continental Teves AG & Co. OHG, Frankfurt am Main (DE)

(72) Inventor: Kai Marcus Rautenberg, Nordstemmen (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 64 days.

(21) Appl. No.: 17/428,362

(22) PCT Filed: Feb. 3, 2020

(86) PCT No.: PCT/EP2020/052549
§ 371 (c)(1),
(2) Date: Aug. 4, 2021

(87) PCT Pub. No.: WO2020/161043
PCT Pub. Date: Aug. 13, 2020

(65) Prior Publication Data
US 2022/0118809 A1 Apr. 21, 2022

(30) Foreign Application Priority Data
Feb. 4, 2019 (DE) ...................... 10 2019 201 357.0

(51) Int. Cl.
*B60G 11/28* (2006.01)
(52) U.S. Cl.
CPC ........ *B60G 11/28* (2013.01); *B60G 2202/152* (2013.01); *B60G 2204/126* (2013.01); *B60G 2206/7104* (2013.01); *B60G 2600/44* (2013.01)

(58) Field of Classification Search
None
See application file for complete search history.

(56) References Cited

U.S. PATENT DOCUMENTS

| 5,655,489 A | 8/1997 | Kammerer |
| 2003/0127788 A1 | 7/2003 | Graeve |

(Continued)

FOREIGN PATENT DOCUMENTS

| CN | 1282687 A | 2/2001 |
| CN | 1826240 A | 8/2006 |

(Continued)

OTHER PUBLICATIONS

German Search Report dated Jan. 16, 2020 for the corresponding German Patent Application No. 10 2019 201 357.0.

(Continued)

*Primary Examiner* — Faye M Fleming

(57) ABSTRACT

A device for fastening an air spring to a body portion of a motor vehicle, at least comprising an air spring cover, wherein the air spring cover comprises at least one fastening means, by means of which the air spring can be connected to the body portion of the motor vehicle, wherein, for attachment of the air spring, the fastening means is plugged through an opening of the body portion and is fixed to said body portion in a force-fitting manner by a securing element, wherein a first and a second plastics part are provided for acoustic decoupling of the air spring, wherein the first plastics part, is clamped between the body portion and the securing element, and the second plastics part is provided so as to be positioned below the body portion.

11 Claims, 2 Drawing Sheets

(56) References Cited

U.S. PATENT DOCUMENTS

| | | |
|---|---|---|
| 2004/0017035 A1 | 1/2004 | Treder |
| 2005/0029062 A1 | 2/2005 | Dean et al. |
| 2006/0169524 A1 | 8/2006 | Born |
| 2008/0136072 A1* | 6/2008 | Kolb ................ B60G 11/28 267/140.11 |

FOREIGN PATENT DOCUMENTS

| | | |
|---|---|---|
| CN | 204113990 | 1/2015 |
| DE | 10039763 A1 | 2/2002 |
| DE | 102010017084 A1 | 12/2011 |
| DE | 102010046613 A1 | 3/2012 |
| DE | 102011086415 A1 | 8/2012 |
| DE | 102012223216 A1 | 6/2014 |
| DE | 102014015092 A1 | 4/2016 |
| DE | 102016210121 A1 | 12/2017 |
| DE | 102017215348 A1 | 3/2018 |
| EP | 2390120 A1 | 11/2011 |
| JP | 2010286099 A | 12/2010 |

OTHER PUBLICATIONS

International Search Report and the Written Opinion of the International Searching Authority dated May 11, 2020 for the counterpart PCT Application No. PCT/EP2019/052549.

Chinese Office Action dated Mar. 15, 2023 for the counterpart Chinese Patent Application 20208008263.0.0.

Chinese Decision of Refusal dated Jun. 29, 2023 for the counterpart Chinese Patent Application No. 202080008263.0 and DeepL translation of same.

* cited by examiner

DEVICE FOR SECURING A PNEUMATIC SPRING WITH AN ACOUSTIC DECOUPLING FUNCTION

CROSS-REFERENCE TO RELATED APPLICATIONS

The present application is a National Stage Application under 35 U.S.C. § 371 of International Application No. PCT/EP2020/052549 filed on Feb. 3, 2020, which claims priority from German Patent Application No. 10 2019 201 357.0 filed on Feb. 4, 2019, in the German Patent and Trade Mark Office, the disclosures of which are herein incorporated by reference in their entireties.

BACKGROUND

1. Field

The present application relates to a device for fastening an air spring to a body portion of a motor vehicle.

2. Description of Related Art

An air spring is arranged between the motor vehicle chassis or a wheel carrier and the motor vehicle body and thereby performs the function of cushioning the wheel. The air spring substantially consists of an air spring cover, a rolling piston and a rolling bellows clamped therebetween in an airtight manner, thereby delimiting a working chamber under air pressure. The rolling bellows is enclosed by a sleeve-shaped outer guide and, during spring compression, rolls on the concentric rolling piston with the formation of a rolling fold. By way of the air spring cover, the air spring strut is connected to the motor vehicle body by means of appropriate fastening means. Use is usually made of stud bolts or screws. Here, said bolts or screws are recessed/introduced in the air spring cover in a gastight manner and are subsequently screw-fastened by means of nuts.

As an air spring strut, a shock damper is arranged within the air spring, said shock damper damping the vibrations of the wheel or of the motor vehicle body. This shock damper is connected on the one hand to the wheel carrier and is supportively fastened on the other hand via a damper bearing in the air spring cover by way of its piston rod, which can dip into the damper tube. Particularly in the dynamic operation of the air spring strut, high tensile and compressive forces act particularly on the pot-shaped bearing receptacle of the air spring cover. These forces are introduced into the motor vehicle body via the air spring cover.

As a rule, the air spring cover bears directly against the body by way of its upper side. Owing to the chassis operation, structure-borne sound waves are introduced into the body, which constitute an unpleasant source of noise. There are increasingly great requirements on the acoustic decoupling of chassis noises into the vehicle interior. New standards in terms of vehicle interior insulation are set in particular by the development progress with respect to E-mobility, since the chassis noises are no longer covered by the engine noises and thus are perceived as unpleasant by the vehicle occupants.

A previous construction, which constitutes an acoustic decoupling system including a screw connection, is for example known from DE 102012223216 A1. In said document, a description is given of an acoustic bearing which is constructed from a plurality of disks and which is arranged between the air spring cover and the body portion. In this case, solid disks composed of steel, aluminum or plastic are used, wherein at least one layer composed of elastomer material, for example composed of polyurethane, is arranged between the solid disks. The fastening means for attachment of the air spring strut to the body portion are plugged through the acoustic bearing. This construction permits the simultaneous transmission of tensile and compressive forces, with acoustic decoupling being effected by way of the elastomer material. As a result, the intention is to prevent the sound waves from being conducted/transmitted in an unimpeded manner into the body and ultimately into the vehicle interior.

The sound waves transmitted from the air spring cover to the body portion are inhibited by the elastomer element. However, the screw connection of this acoustic bearing is elaborate and awkward during assembly. Firstly, three fastening means are provided in the air spring cover, by means of which the air spring cover is connected to the acoustic bearing, and, secondly, three further fastening means which are recessed in the acoustic bearing are provided, by means of which the acoustic bearing is in turn connected to the body portion. In this way, the intention is to in fact prevent a direct metallic force path between the air spring cover and the body, in order to bring about structure-borne sound insulation. However, direct metallic contact remains as a result of the screw connection of a screw bolt to the inner solid disk of the acoustic bearing and the body portion.

SUMMARY

It is therefore an object of the present application to improve the acoustic decoupling in the case of the fastening of an air spring to a portion of a motor vehicle body.

The object on which the present application is based is achieved by means of the features of the independent patent claim.

According to the present application, a device for fastening an air spring to a body portion of a motor vehicle is provided, at least comprising an air spring cover, wherein the air spring cover comprises at least one fastening means, by means of which the air spring can be connected to a body portion of the motor vehicle, wherein, for attachment of the air spring, the fastening means is plugged through an opening of the body portion and is fixed to said body portion in a force-fitting manner by a securing element, wherein a first and a second plastics part are provided for acoustic decoupling of the air spring, wherein the first plastics part is clamped between the body portion and the securing element and the second plastics part is provided so as to be positioned below the body portion. The air spring cover is preferably manufactured from a thermoplastic or thermosetting plastic.

In order to prevent direct metallic contact in the case of the attachment of the air spring cover to the body portion, as a result of the use of suitable plastics materials according to the present application, a reflection effect at the boundary surfaces of the contacting components is utilized during the transmission of structure-borne sound waves. In this case, the first and the second plastics part are in the force path of the attachment in such a way that the structure-borne sound waves transmitted from the air spring cover to the fastening means are inhibited during the propagation into the body portion. In this case, this construction reduces the effective connected surfaces of the components and ensures that the fastening means is spaced apart from the body portion. The effective surface for the transmission of structure-borne sound is thus reduced significantly by the geometric configuration of the first and second plastics part. In addition, the different material properties of plastic compared with metal have a sound-reducing effect.

The achievement of the mechanical decoupling of the fastening means and the body portion by way of the use of two plastics parts also leads to a considerable weight reduction and thus also to a reduction in costs. Furthermore, there are versatile geometric design possibilities for the construction according to the present application.

According to a preferred embodiment, the second plastics part is a sleeve which is pushed onto the fastening means in such a way that the air spring cover is spatially spaced apart from the body portion. The sleeve is positioned between the air spring cover and the lower side of the body portion and, as a result, serves as a spacer.

According to another preferred embodiment, the second plastics part is a ring which is pushed onto the fastening means, and which terminates flush with the air spring cover, in such a way that the ring and the air spring cover bear against the body portion. In this configuration, the ring as second plastics part is embedded in the air spring cover, and therefore both ring and air spring cover bear with their upper side against the lower side of the body portion in an areal manner. This solution does not increase the axial installation space requirement, and likewise ensures acoustic decoupling. In this case, it is important that the ring lies in the axial force path of the fastening means and the securing element.

According to a further alternative embodiment, the second plastics part is formed from the material of the air spring cover in such a way that said material surrounds the fastening means in a ring-shaped manner, and therefore the air spring cover bears against the body portion. In this configuration, the ring is replaced by the material of the air spring cover, wherein the material encloses the fastening means in such a way that said material likewise lies in the axial force path of the fastening means and the securing element and ensures that the fastening means is spaced apart from the body portion.

According to a further preferred embodiment, the first plastics part is a disk. This disk serves as a preload element and ensures that there is a sufficient preload force for fixing the securing element to the fastening means in an adequate manner. It also ensures that the securing element, which is manufactured from metal, is spatially spaced apart from the body portion, with the result that there is no direct metallic contact. The disk is likewise geometrically designed in such a way that the effective surface contact with respect to the body portion is as small as possible, in order to ensure the greatest possible reflection of the structure-borne sound waves.

According to a further preferred embodiment, the fastening means, in terms of diameter, is smaller than a through-bore of the body portion. So that direct metallic contact between the fastening means and the body portion is avoided not only in an axial direction but also in a radial direction, it should be ensured that the fastening means does not bear against the body portion. The diameter of the shaft of the fastening means is therefore dimensioned so as to be smaller than the diameter of the through-bore through which the fastening means is pushed.

According to a further preferred embodiment, the first and/or the second plastics part are/is manufactured from a thermoplastic. In order to ensure a sufficient preload of the first plastics part, in particular radiation-crosslinked thermoplastics are advantageous since these have a high creep behavior. This ensures that the preload of the fastening means does not decrease to an impermissible extent over the service life.

In the case of such plastics, the creep modulus is a key characteristic variable. Said creep modulus describes the time-related loading of the plastic taking into account the mechanical stress and the time-dependent strain. Therefore, according to the example, thermoplastics having a creep modulus (0.5% 1000 h) of 700 MPa in accordance with ISO 899-1 are used.

As an alternative preferred embodiment, the first and/or the second plastics part are/is manufactured from a thermoset. Thermosetting plastics are particularly advantageously suitable for obtaining the preload, since these do not tend to exhibit creep.

The fastening device according to the present application can be used in the case of a free-standing air spring, but, according to a further preferred embodiment, can also be used in the case of an air spring with an integrated shock damper, that is to say an air spring strut.

The device is used in a chassis of a motor vehicle.

BRIEF DESCRIPTION OF THE DRAWINGS

Further preferred embodiments of the present application emerge from the dependent claims and from the following description of exemplary embodiments with reference to the figures, in which:

DETAILED DESCRIPTION

Figure 1:
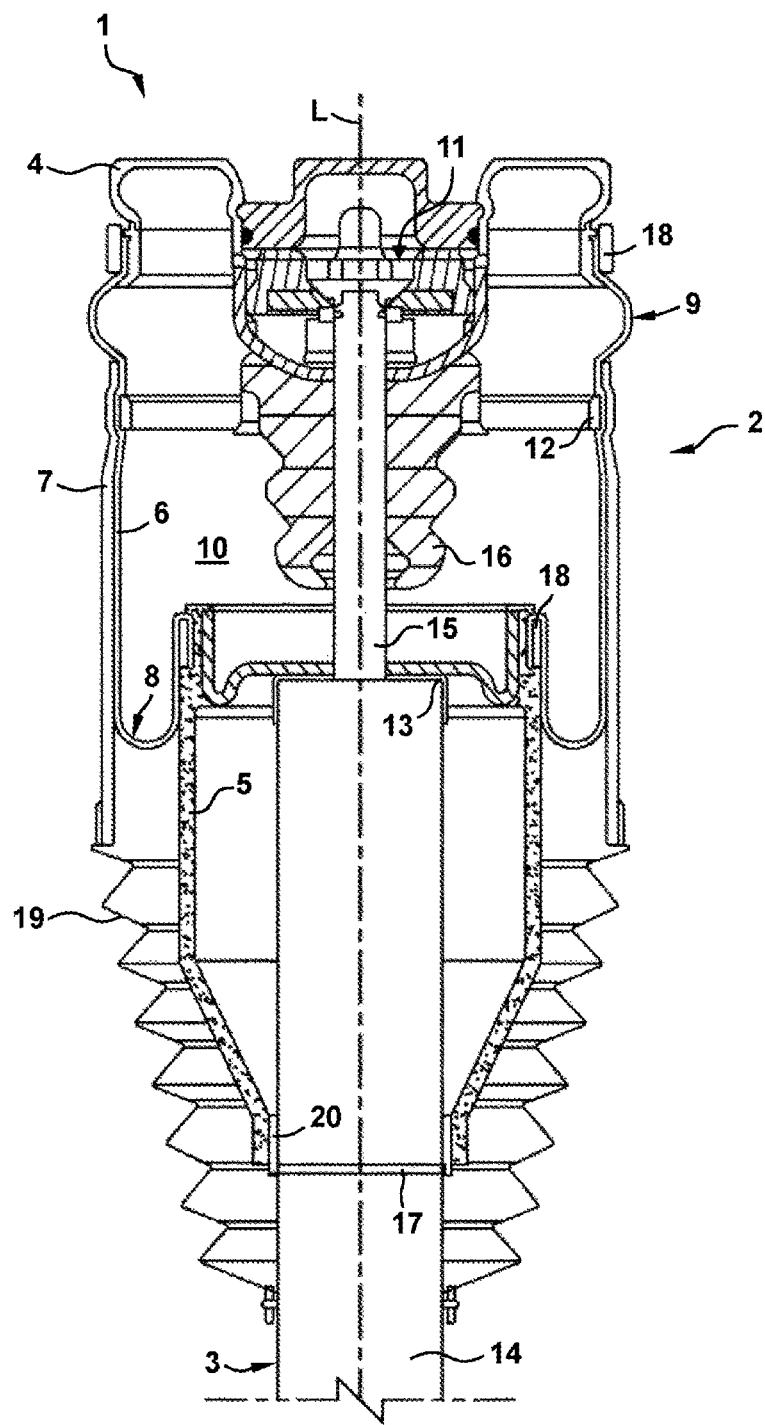
FIG. 1 shows an air spring strut according to the prior art.

FIG. 1 shows a known air spring strut 1 having the essential components, namely air spring 2 and shock damper 3, wherein the air spring 2 comprises an air spring cover 4, a rolling piston 5 and a rolling bellows 6 with an outer guide 7 which encloses it in the manner of a sleeve. The shock damper 3 is provided within the air spring 2, the shock damper 3 comprising a damper tube 14, a piston rod 15 which can dip into the latter, and a damper bearing 11.

The air spring strut 1 satisfies two functional areas: on the one hand, the air spring 2 generates the carrying force, while the shock damper 3 is responsible for linear guidance. Fastening means on the air spring cover 4 make it possible for the air spring strut 1 to be fastened on the one hand to a motor vehicle body and on the other hand, via a shock damper eye (not illustrated), to a wheel carrier of the motor vehicle chassis, with the result that the motor vehicle is sprung and damped.

This regular installed position of an air spring strut determines the "up/down" orientation.

The air spring 2 comprises a rolling bellows 6 composed of elastomer material, the rolling bellows 6 delimiting, with the air spring cover 4 and the rolling piston 5, an airtight, volume-elastic working chamber 10 which can be filled with compressed air. The hose-shaped rolling bellows 6 is fastened by its first end to the air spring cover 4 and by its second end to the rolling piston 5 via clamping rings 18 at the connection regions of these air spring attachment parts.

In the case of relative movements along the longitudinal axis L of the air spring strut 1 between the air spring cover 4 and the rolling piston 5, the rolling bellows 6 rolls on the concentric rolling surface of the rolling piston 5 with the formation of a rolling fold 8. Furthermore, the rolling bellows 6 forms a cardanic fold 9 on the air spring cover 4 that acts as a cardanic bearing. At the same time, the rolling bellows 6 is provided with embedded strength members.

Particularly in the case of the comfortable axial bellows, that is to say with strength members oriented in the axial direction, use is made of outer guides 7 to limit the lateral extension of the rolling bellows 6. Here, the outer guide 7 is clamped against the rolling bellows 6 by an inner locking ring 12 provided in the working chamber 10.

In order to protect the rolling fold 8 from contamination, there is provided a folding bellows 19 which is fastened, for example, to the wheel-carrier-side end region of the outer guide 7 and to the damper tube 14.

An additional spring 16 is arranged bearing against the lower side of the air spring cover 4 and facing toward the shock damper. The additional spring 16 has a through-bore for the piston rod 15 and therefore encloses the latter. During spring compression, the end side of the damper tube 14 moves toward the air spring cover 4, and therefore the additional spring 16 serves as a travel limiter and damps possible forces acting on the air spring cover 4.

The damper tube 14 of the shock damper 3 is provided within the rolling piston 5 or is surrounded by the hollow cylindrical rolling piston 5 at least in certain regions, it being possible for the rolling piston 5 to be fastened standing on the damper tube via a supporting ring 17 or hanging on the end side of the damper tube 14 via a bearing element 13. A combination of standing and hanging rolling piston 5 is also possible, as visible in the figure. It is additionally known to produce the rolling piston 5 from a light metal, such as aluminium, or a fiber-reinforced plastic.

In the case of a standing rolling piston 5, a sealing system 20, for example made of elastomer sealing rings, is provided between the end region facing the wheel carrier and the opposite outer wall of the damper tube 14. This serves to seal to the outside the working chamber 10, which can be expanded within the rolling piston, of the air spring 2.

The illustrative fastening of an air spring strut to a body portion is described with reference to the figures that follow.

Figure 2:
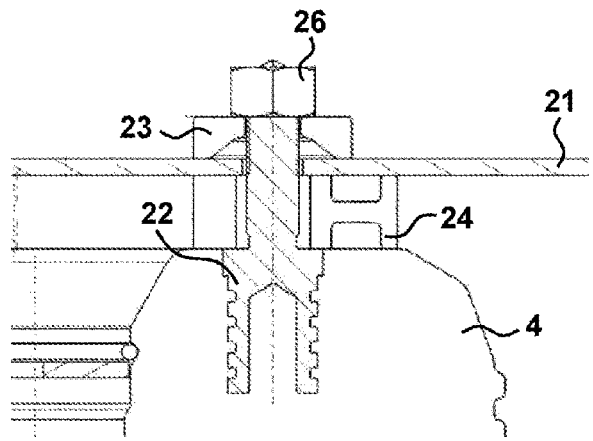
FIG. 2 shows a first illustrative attachment of an air spring strut.

FIG. 2 shows a detail of a first illustrative attachment of the air spring cover 4 of an air spring strut to a body portion 21. A fastening means 22 is at least partially recessed into the air spring cover 4 of said air spring strut. Said fastening means is representative of a multiplicity of fastening means by means of which the air spring cover 4 is fastened to the body portion 21. Preferably, three fastening means are provided on the air spring cover 4 so as to be distributed in a circumferential direction.

The fastening means 22 is embodied in the manner of a screw bolt, which is enclosed in the air spring cover 4. The air spring cover 4 is preferably manufactured from plastics material. A part of the fastening means 22 is provided with an external thread and protrudes out of the air spring cover 4. This shaft is plugged through a corresponding through-bore of the body portion 21. In order to attach the air spring strut in a force-fitting manner, the fastening means 22 is fixed to the upper side of the body portion 21 by means of a securing element 23, in the form of a nut. The securing element 23 is equipped with an internal thread and is braced with the fastening means 22 in such a way that the air spring cover 4 is securely fastened to the body portion 21. Other fastening concepts are also possible.

In order to prevent direct transmission of structure-borne sound into the motor vehicle body, an acoustic decoupling system in the form of two plastics parts is provided according to the example.

A first plastics part 23, in the form of a disk, is positioned between the securing element 26 and the body portion 21. When the securing element 26 is tightened, the plastics part 23 is braced and brings about a clamping force for fixing of the fastening means 22.

A second plastics part 24, in the form of a sleeve, is pushed over the shaft of the fastening means 22 beforehand and is thus positioned between the air spring cover 4 and the body portion 21. The second plastics part 24 bears against the lower side of the body portion 21 and serves as a spacer. Here, it should be ensured that the second plastics part 24 rests with its lower side on the annular surface of the fastening means 22 in order to be effective. In this configuration, the annular surface of the fastening means 22 terminates flush with the upper side of the air spring cover 4.

The fastening means 22 and the body portion 21 are metallic elements. On account of their virtually identical material properties, said fastening means and body portion should be provided so as to be separate from one another, in order to prevent the uninhibited transmission of structure-borne sound waves. That is to say there should be no direct metallic contact between the fastening means 22 and the body portion 21. To this end, as can be seen from FIG. 2, the shaft of the fastening means 22 has a diameter which is smaller than the through-bore of the body portion 21 that is provided for said means.

The two plastics parts 23, 24 are provided so that the structure-borne sound waves which are conducted from the air spring cover 4 into the fastening means 22 do not pass directly into the body portion 21. By virtue of the two plastics parts 23, 24, during the transition into the body portion 21 the structure-borne sound waves are largely reflected and thus also absorbed. There is no direct metallic transmission of structure-borne sound into the motor vehicle body, rather the transmission of structure-borne sound is effectively reduced by the plastics parts 23, 24.

According to the example, the two plastics parts 23, 24 thus ensure acoustic decoupling of the attachment of the air spring strut to the body portion 21, whereas the fastening means 22 ensures that the tensile and compressive forces are absorbed.

Suitable materials for the plastics parts 23, 24 are plastics having a high creep behavior, that is to say a high creep modulus. These are thermoplastics whose creep behavior has been optimized for example by radiation crosslinking or else thermosets which likewise have a suitable creep behavior.

In order to ensure that the fixing of the fastening means 22 by way of the securing element 23 is assured in a long-lasting manner and under load, the fixing has to be effected with a defined preload. Here, the elastic deformation is distributed to the first and the second plastics part 23, 24 in dependence on their area and stiffness.

Figure 3:
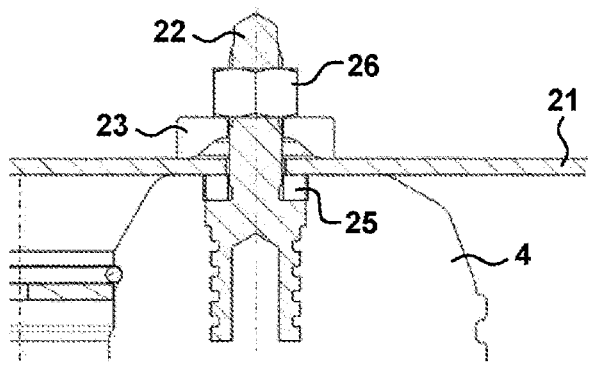
FIG. 3 shows a second illustrative attachment of an air spring strut.

FIG. 3 shows a partial detail of a second illustrative attachment of an air spring strut, in the case of which the second plastics part is designed in the form of a ring 25. The function and mode of action of this second exemplary embodiment are identical to the first exemplary embodiment of FIG. 2.

Instead of positioning a sleeve below the body portion 21, a ring 25 as second plastics part is pushed over the shaft of the fastening means 21, such that said ring acts as a buffer. In this case, the ring 25 is embedded in the air spring cover 4 in such a way that the upper side of the ring 25 terminates flush with the upper side of the air spring cover 4 and the lower side of the ring 25 rests on the annular surface of the fastening means 22. That is to say that, in the connected state of the air spring strut, the upper side of the ring 25 and the upper side of the air spring cover 4 together bear against the lower side of the body portion.

In addition, the second plastics part 25 constitutes a metallic decoupling of the fastening means 22 with respect to the body portion 21, because said second plastics part lies in the axial force path of the annular surface of the fastening means 22 and the lower side of the body portion 21, without the fastening means 22 being in direct contact with the body portion 21.

In order to bring about the mode of action of the acoustic decoupling by means of two plastics parts, the second plastics part 25 has a special manufacturing process. First, the fastening means 22 comprises a relief groove toward its annular surface, such that the inner wall of the second plastics part 25 at least only partially bears against the shaft of the fastening means 22. Furthermore, the outer diameter of the second plastics part 25 is smaller than the diameter of the corresponding cutout in the air spring cover 4. That is to say the outer wall of the second plastics part 25 does not abut the material of the air spring cover 4 in the radial direction.

Figure 4:
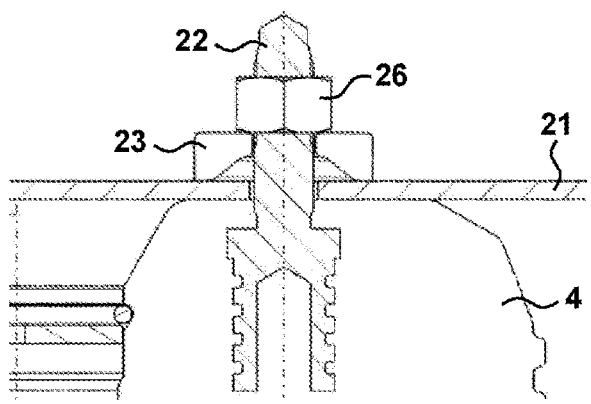
FIG. 4 shows a third illustrative attachment of an air spring strut.

The second plastics part is dispensed with in the third exemplary embodiment of FIG. 4. In the region of the relief groove, the shaft of the fastening means 22 is surrounded by the material of the air spring cover 4 in such a way that said material acts as a spacer between the fastening means 22 and the body portion 21. Here, the material used for the air spring cover 4 is a thermoplastic or a thermoset. The structural design also brings about acoustic decoupling, since the air spring cover which is manufactured from plastics material acts as the second plastics part and bears with its upper side against the lower side of the body portion 21. As a result, the fastening means 22 is likewise acoustically decoupled from the body portion 21. Consequently, the function and mode of action of this third exemplary embodiment are likewise identical to the first exemplary embodiment of FIG. 2.

The invention claimed is:

1. A device for fastening an air spring to a body portion of a motor vehicle, the air spring comprising an air spring cover, the device comprising:

a fastening means for connecting the air spring to the body portion of the motor vehicle, wherein, for attachment of the air spring, the fastening means is plugged through an opening of the body portion and is fixed to the body portion in a force-fitting manner by a securing element, wherein a first plastics part and a second plastics part are provided for acoustic decoupling of the air spring, and wherein the first plastics part is clamped between the body portion and the securing element and the second plastics part is provided to be positioned below the body portion.

2. The device as claimed in claim 1, wherein the second plastics part is a sleeve pushed onto the fastening means such that the air spring cover is spatially spaced apart from the body portion.

3. The device as claimed in claim 1, wherein the second plastics part is a ring pushed onto the fastening means, and which terminates flush with the air spring cover such that the ring and the air spring cover bear against the body portion.

4. The device as claimed in claim 1, wherein the second plastics part is formed from a material of the air spring cover such that the material surrounds the fastening means in a ring-shaped manner and the air spring cover bears against the body portion.

5. The device as claimed in claim 1, wherein the first plastics part is a disk.

6. The device as claimed in claim 1, wherein the fastening means, in terms of shaft diameter, is smaller than a through-bore of the body portion.

7. The device as claimed in claim 1, wherein the first plastics part and the second plastics part are manufactured from a thermoplastic.

8. The device as claimed in claim 1, wherein the first plastics part and the second plastics part are manufactured from a thermoset.

9. The device as claimed claim 1, wherein the air spring comprises an integrated shock damper.

10. A motor vehicle comprising a chassis with a device as claimed in claim 1.

11. The device as claimed claim 1, wherein the first plastics part is entirely above the body portion and entirely below the securing element.

* * * * *